Jan. 14, 1930.   W. J. MURDOCK ET AL   1,743,725
APPARATUS FOR MANUFACTURE OF COMBUSTIBLE GAS
Original Filed Sept. 23, 1924
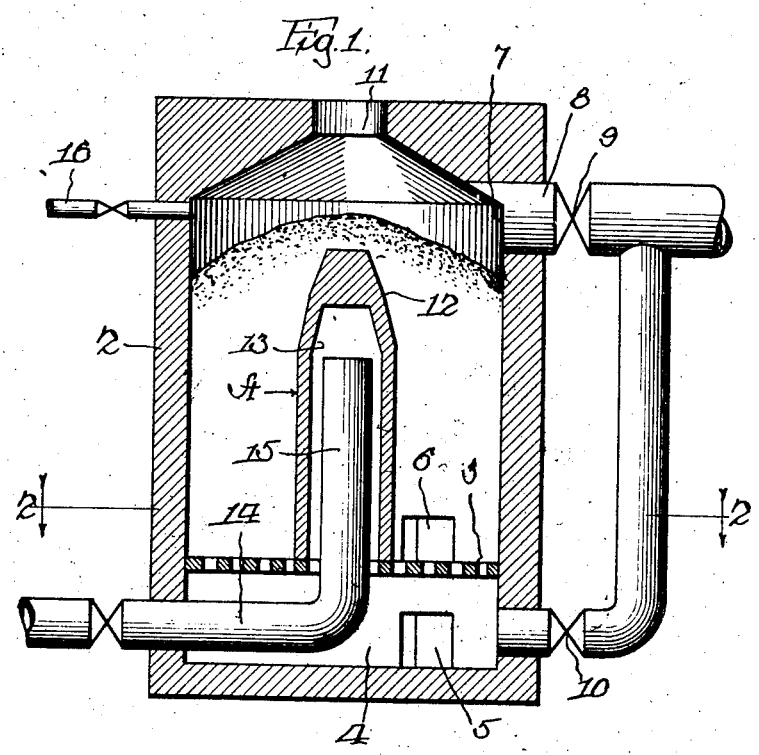
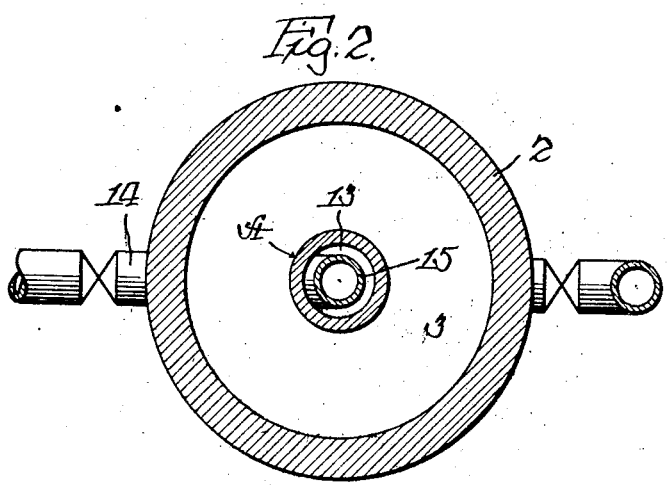

Patented Jan. 14, 1930

1,743,725

UNITED STATES PATENT OFFICE

WILLIS J. MURDOCK, OF JOLIET, AND EDGAR E. LUNGREN, OF AURORA, ILLINOIS, AND OWEN B. EVANS, OF PHILADELPHIA, PENNSYLVANIA, ASSIGNORS TO PIER PROCESS CORPORATION, OF AURORA, ILLINOIS, A CORPORATION OF ILLINOIS

APPARATUS FOR MANUFACTURE OF COMBUSTIBLE GAS

Original application filed September 23, 1924, Serial No. 739,282. Divided and this application filed August 28, 1926. Serial No. 132,268. Renewed November 21, 1929.

This invention relates to improvements in apparatus for manufacture of combustible gas, and the present application is a division of our co-pending application, Ser. No. 739,282, filed September 23, 1924, now Patent 1,602,242, granted October 5, 1926.

In the manufacture of combustible gas, such as blue or carbureted water gas, or producer gas, from solid fuel, one of the main operations is the blasting which takes place in the generator, by which the bed of fuel is gradually and progressively reduced and heated to incandescence in order to permit the necessary chemical reactions taking place in the generator.

Gas generating fuels as received at the gas producer are ordinarily composed of mixed sizes, and as the fuel is charged into the usual cylindrical generator, it is a well known fact that the finer or smaller particles of the fuel, sometimes referred to as the "fines", tend to concentrate in the center of the generator, and the larger or coarser particles tend to gravitate or roll towards the confining walls, that is, there is a natural tendency of solid fuels to more or less segregate into an outer mass of larger or coarser particles, and an inner or central core or mass of finer or smaller particles. Furthermore, when the fuel is charged into the generator from the top, as customary, there is a natural tendency of the fuel to crown at the center on the top of the fuel bed.

Experience has demonstrated that where the fuel in the generator is permitted to follow its normal course in the manner indicated in the preceding paragraph, there is a very noticeable variation in the degrees of permeability of the fuel bed to the passage of the air or steam, or air and steam blasts up through the supporting grate and through the fuel bed or in the reverse direction, the outer portion of the mass adjacent the retaining walls of the generator offering a very much less resistance to the passage of the blasts therethrough than the central portion or mass, with the result, in actual practice, that the outer portion of the fuel bed for a more or less determinable definite distance from the wall, depending upon the particular characteristic of the fuel being used, becomes activated or what is known as an "active area", whereas the central mass of the fuel bed becomes what is known as an "inactive area".

As the fuel is consumed in an ordinary generator of circular cross section, and new charges added, the entire mass descends gradually and slowly to the grate. When a fuel low in volatile matter is used, such as anthracite coal or coke, it passes from the upper zone of what is called "green" or comparatively cold fuel to the next lower zone of incandescent fuel during the distillation, carbonization and processing thereof and finally from the incandescent zone down to the last zone of spent fuel or ashes resting upon the grate. When fuel high in volatile matter is used, such as bituminous coal, there is an additional zone, commonly called the "plastic zone", which forms above the incandescent zone due to the driving off of the large amounts of volatile matter therefrom in the distillation and processing thereof to the coke condition necessary to obtain a water gas reaction. During this gradual descent of the fuel through the generator, the outer portions of the fuel, in contact with or closely adjacent to the retaining walls of the generator, are appreciably retarded in their movements because of the friction between those portions of the fuel and the walls, whereas the center portion of the mass of fuel is free to settle more quickly, thus producing a differential settling action, which further tends to compact or solidify the center portion of the fuel and loosen or render more permeable the outer peripheral portions of the fuel. The settling action described further tends to increase the difference in permeability to the blasts of air and steam between that of the outermost portions and that of the center portions of the fuel bed.

Another factor still further tending to increase the difference in permeability between the outermost portions, and the inner portions of the fuel bed, when bituminous coal is used in the generator, is that which results from the formation under heat, of the plastic zone referred to, which during the progression of combustion envelops the central inert mass, so as to completely cut off the same from blasting and carbonization. This condition is due to the difference in permeability referred to, causing a distinct and well known tendency of the air, when introduced below the grate, to select a passage up through the generator between the refractory wall and the fuel itself, rather than through the body of the fuel, resulting in much more rapid combustion and higher temperatures being evolved, in this portion of the fire. This condition is observable in connection with all kinds of generator fuels, but in the case of a soft coal fire is accentuated because there is a shrinkage of the fuel away from the refractory wall of the generator during the process of carbonization, giving a still freer passage to the air. The high degree of heat which is thus evolved about the periphery of the fire progresses through the bed of fuel horizontally relatively to the refractory walls of the generator, and to a known limited distance from such walls, and this portion of the fuel rapidly reaches a state of incandescence during the blast, ready for the water gas reaction, for a horizontal width of substantially from 18 to 24 inches inwardly from the wall of the generator, which is an appreciable distance from the center thereof. This action causes the formation, during the various stages of progression of the active portion of the fuel, of the sticky plastic zone of partially coked fuel immediately in advance of the incandescent area throughout its extent, and since such area extends inwardly from the wall of the generator only approximately from 18 to 24 inches, the plastic formation completely surrounds the inner mass of the fuel bed. Inside of this plastic envelope there will be found fuel which is not completely distilled or carbonized, to a depth reaching to, or almost to the grate, which is impervious to the blast, and the consequence is that this inert mass is almost entirely inactive and uncarbonized.

The result of the combination of all or some of the foregoing factors normally tending to take place in a generator of the usual character with the usual method of manufacture where the entire mass of fuel is supported on a grate of the usual character, is to produce an outer mass or area, which is relatively very active and subject to rapid combustion, and an inner central portion or mass which is inactive and in which little or no combustion takes place. Furthermore, where a very active area is developed, so-called "weak spots" are produced in those portions of the fuel bed with the result that "channelling" ensues, thus permitting a relatively excessive flow of air in and adjacent the channels, more rapid burning or consumption of the adjacent fuel, and an increased flow of air, steam and gas. In such condition of unstable equilibrium, the channelling action becomes progressive and may, and often does, reach a point such that all the blast is practically concentrated in one path through the body of fuel and this, in turn, permits the blast to assume a very high velocity in its passage through the fuel and to carry with it portions of solid fuel over into the fixing chamber, thus causing frequent clogging of the latter, and necessitating shutting down to clean it out, with consequent loss of time and use of the apparatus.

The foregoing condition occurs with all solid generating fuels in general, and is particularly accentuated when bituminous coal is used, due to its immobile and sticky character when partially coked, causing it to form the plastic zone which is not only impervious to blasting as before stated, but will not of itself, fill the holes or channels which may be formed, and it becomes necessary to bar the fuel bed frequently.

Objects of our invention, therefore, are to provide an improved generator or apparatus for the manufacture of a combustible gas from solid fuel, which will obviate all of the disadvantageous features hereinbefore described and common to present types of gas generators now in use; to provide a generator so constructed and arranged as to always insure a bed of fuel of practically or substantially uniform permeability to the blast products and which body of fuel will be rendered substantially uniformly active throughout its entirety; to provide an apparatus so arranged that the activated area of the fuel bed will be greatly increased as compared with generators now commonly used; to provide a generator having means so arranged as to prevent the formation of or the initiation of any inactive or impermeable core or mass in the fuel bed; and, in general, to provide a generator wherein the efficiency and economy of operation is far superior to those now in general use.

A more specific object of our invention is to provide an improved apparatus possessing the above indicated desirable features, which improvements may be incorporated in many generators now commonly in use, as comparatively small cost of installation and without any substantial loss of time in the use of the generator.

Our invention, considered from some of its broader aspects, consists in providing a generator so constructed and arranged that the conglomerate mass of solid fuel, as it is charged into the generator and in its passage through the generator, will be so disposed and distributed that every portion of the fuel bed will be within an "active" area with respect to a radiating wall of the generator, thus preventing the initiation of the formation of a compacted, relatively impermeable portion at any point in the fuel bed; in providing a generator so constructed and arranged as to increase very materially the amount of radiating wall bounding area for the fuel, relative to the volume of the fuel contained within the generator; in so arranging and constructing the generator as to provide a refractory body extending well into or through the zone of loose or green fuel to occupy that portion of the fuel bed which would normally be inert and inactive; in so arranging the parts of the generator that the fuel will be distributed in such manner, during the processing thereof, that the distance between any two walls transversely of the fuel bed, or transversely of the direction of the blasts, does not exceed twice the width of the known or determinable active area of the fuel bed with respect to a radiating wall; and to make provision for blasting uniformly throughout the grate supported area of the fuel.

In the drawing forming a part of this specification, Figure 1 illustrates a vertical, diametrical section of a gas generator of cylindrical form, having our improvements embodied therein; and Figure 2 is a transverse sectional view of the generator shown in Figure 1 and taken approximately on the line 2—2 thereof.

In said drawing, the gas generator proper is indicated at 2, the same preferably being of cylindrical formation as generally employed, and preferably lined on the interior of the outer confining wall with refractory material. Said generator is preferably provided with a horizontally extended grate 3, which may be of usual construction and disposed above the bottom of the generator proper so as to leave an ash pit 4 from which some of the ashes may be removed through a suitable ash pit door 5. Clinker doors of any desirable construction are indicated conventionally at 6. As customary in a generator of this character for producing carbureted water gas, the generator is provided with an offtake passage 7, near the top, the gases being conducted through a suitable pipe 8 having the usual interconnected valves 9 and 10. The fuel, as customary, is charged through the top opening 11.

For the purpose of carrying out our invention in the type of generator shown, we provide a centrally disposed pier or cone indicated broadly by the reference character A, said pier or cone A preferably being of circular cross section and disposed centrally of, and supported upon the grate 3. Such pier may be of any desired construction, that is, either hollow or solid, or of a suitable built up construction where intended for application to a generator already in use, and is preferably composed of suitable refractory material. The topmost portion of the pier is preferably cone shaped, as indicated at 12, so as to facilitate the uniform distribution of the fuel all around the generator as the fuel is charged through the top opening 11. In actual practice, and this is an important consideration in our invention, the pier will be extended well up into the green or loose zone of the fuel, and preferably substantially level with the offtake opening 7. In this manner, the beginning or initiation of the formation of a central inactive zone in the body of the fuel at any stage of distillation, carbonization or processing thereof, is prevented. Furthermore, the amount of fines in the fuel which would normally tend to concentrate and compact in the center portion of the generator occupied by the pier A, will be distributed in an annulus of much greater radius, and thoroughly intermingle with the larger portions of the conglomerate mass of fuel.

Although the pier A may be of any solid construction desired, it may be provided with an interior chamber 13, extending from the bottom of the pier to a point adjacent the top thereof, which chamber is preferably utilized for the introduction of means for suitably cooling the pier, so as to prevent overheating thereof and possible deterioration due to this cause. This is accomplished by providing the combined steam and air blasting conduit 14 which extends into the ash pit 4 a suitable distance, with an angular extension 15, which projects upwardly a suitable distance into the chamber 13 of the pier A, and is suitably spaced from the inner walls thereof, so that the blasts of relatively cool air or steam from the conduit 14 are directed upwardly into the chamber 13, and then pass downwardly out of the pier, and upwardly through the grate into the body of fuel supported thereby, the contact of such air or steam with the walls of the pier serving to effectually cool the same. A steam inlet 16 of any suitable construction is also usually provided at the upper portion of the generator for blasting the fuel body in a reverse direction, or downwardly, in a well known manner.

From the preceding description, considered in connection with the drawings, it will be observed that the blasts have equal and uniform accessibility to the bottom of the fuel through all portions of the grate, thus insuring uniform admission of the blasts to the body of the fuel. By proportioning the generator so that the distance between the opposed wall surfaces of the generator and the pier is at no point more than twice the known width of the active area of the fuel with respect to a retaining wall, all portions of the fuel are necessarily arranged within such active area with respect to such walls through the entire mass of fuel from top to bottom. Furthermore, not only are all portions of the fuel located within an active radiating area of a retaining or confining wall, but, in addition, the extension of the central pier well up into the loose or green fuel zone to a point substantially on a level with the offtake, prevents the initiation or formation of any centrally disposed, inert or inactive or impermeable core or mass with the result that the body of fuel, as it gravitates down through the generator from the loose or green fuel zone to the incandescent zone, is distilled and processed uniformly throughout the cross-sectional area of the body of fuel.

A common size for a generator of circular cross-section with a bottom such as indicated in the drawing and hereinbefore described, used in the manufacture of carbureted water gas, is one having an inside diameter of 9 feet. With such a generator, using bituminous coal as the generating fuel, we have found from actual experience, that very efficient results are obtained with our invention where a pier or cone, such as shown in Figure 1 of refractory material is employed of 3 feet outside diameter, centrally disposed on the grate as indicated in the drawing. With such an arrangement, it will be observed that there is no portion of the fuel bed which is more than 18 inches from any radiating wall of the generator, and further, that the blasts of air and steam are over the entire grate-supported area of the fuel bed with equal facility and action at all points, thus assuring uniformity of combustion within the entire body of the fuel. Actual practice has demonstrated that, where air and steam blasts are permitted to enter the body of the fuel through the grate with relative uniformity throughout the entire area supported by the grate, that active zones will be formed within a distance of about 18 to 24 inches of any refractory wall, this active zone being assured by the passage of preheated gases through the fuel or by radiation from the heated refractory surfaces, or by a combination of the two. Consequently, it will be observed that by the use of our invention, all portions of the fuel are brought within an assured active zone of substantially uniform permeability and uniform rate of combustion.

By way of comparison, we have found that the best results obtainable under the prior common practice with a carbureted water gas set, using bituminous coal, the generator of which was 9 feet internal diameter, was by blasting at the rate of 5,000 cubic feet of air per minute, with a resulting capacity of approximately 1,800,000 cubic feet of gas per 24 hours, whereas, by the addition of a pier such as we have shown and described of 3 feet outside diameter, the capacity was increased to 2,500,000 cubic feet of gas per 24 hours, the amount of fuel blown over into the fixing chamber was decreased approximately 50%, the amount of fuel required per 1,000 feet of gas was decreased approximately 8 lbs. and the amount of clinkers formed was materially decreased. By way of a rough approximation, it may be stated that in the generator used without any pier, the active area is that of the annulus having an outside diameter of 9 feet and an inside diameter of 6 feet (that is, 9 feet less two times 18 inches) or approximately 35.3 sq. ft., whereas, by the introduction of the pier of 3 feet, outside diameter, the active area was increased to that within the annulus having a 9 foot outside diameter and a 3 foot inside diameter, or approximately 56.6 sq. ft., that is, an increase of approximately 60% in the active area, and an increase of approximately 67% in the capacity.

We have herein shown and described what we now consider the preferred manner of carrying out our invention and have described the same more particularly with reference to a gas generator having blast provisions particularly adapted for the manufacture of water gas, but, as will be understood by those skilled in the art, our improvements are not limited to use in the manufacture of water gas and are adaptable to the manufacture of other combustible gases. It will be understood that although the outer bounding wall of the generating chamber and the cross-sectional configuration of the pier have been herein described as being preferably of the circular type, the configuration or outline of these elements may be varied to a considerable extent without departing from the spirit of the invention, provided the essential disposition of the bounding surfaces of these elements is substantially maintained. All changes and modifications of the invention coming within the scope of the appended claims are, therefore, contemplated.

We claim:

1. The herein described improved generator for combustible gas, which includes a gas generating chamber having an outer circular bounding wall, the inner surface of which is provided with refractory material; a pier circular in cross section having its outer wall provided with refractory material, said pier being centrally disposed with reference to the outer wall proper, the wall of said pier and the outer bounding wall of the generator defining a fuel chamber closed at the bottom by a grate, the latter being adapted to support a fuel bed, the distance between the refractory surface of the outer wall of the generator and the refractory surface of the pier wall and the cross sectional area of the fuel bed between said walls being correlated in such a way as to provide means for preventing the formation of inactive fuel masses which would otherwise normally be formed in the fuel bed during operation; means for blasting the fuel bed in said generator; and means for taking off the gas as it is formed.

2. In a gas generator of the character described, the combination with a circular outer wall adapted to accommodate carbonaceous fuel; a grate at the bottom of said generator for supporting a body of said fuel within the said generator; means for eliminating inactive zones in said fuel body, said means comprising a pier of a predetermined diameter extending centrally through the fuel body, said pier providing a wall spaced from the inner surface of the outer circular wall of the generator a distance determined by the active area of the fuel body with reference to a bounding wall so that said walls confine and maintain all portions of the fuel body within active areas with respect to each wall throughout the extent of the fuel body; means for blasting said fuel body alternately from end to end; and means adjacent the top and bottom of the generator for taking off the gas formed during operation of the same.

3. In a gas generator of the character described, the combination with an outer circular bounding wall with a grate at the bottom thereof, and an ash pit beneath said grate, said generator having a fuel charging opening at the top; a centrally disposed pier extending upwardly from said grate, the upper end of said pier being arranged in line with said charging opening and said pier provided with a tapered upper end, the outer wall of said pier and the inner surface of the circular wall of said generator being so spaced with relation to each other as to provide means for preventing the formation, throughout the extent of the fuel body, of inactive fuel masses, which would otherwise normally be formed in the fuel bed during blasting; blasting means extending into said generator beneath said grate and discharging axially with reference to said pier whereby the blast is distributed uniformly through the grate and the fuel body supported thereby; and a gas offtake entering the generator adjacent the top above the upper end of said pier.

4. The herein described improved generating apparatus for manufacturing water gas, which includes: a water gas generating chamber havng an outer enclosing wall adapted to accommodate a fuel body and a pier centrally disposed with reference to said enclosing wall and said fuel body, the inner surface of the enclosing wall and the outer surface of the pier being arranged so as to provide means for coordinating the cross-sectional area of the fuel body with respect to the distance between the bounding surfaces of the enclosing wall and the pier wall whereby uniform active combustion of the fuel body throughout its extent during operation of the generator is insured; means for blasting said fuel body with air; means for blasting said fuel body with up and down runs of steam; and means for taking off the water gas from the generating apparatus.

5. The herein described improved generator for combustible gas which includes: a gas generating chamber proper having an outer enclosing bounding wall and a pier centrally disposed with reference to said bounding wall the outer surface of said pier and the inner surface of the outer bounding wall of the generator defining a fuel chamber closed at the bottom by a grate, the latter being adapted to support a fuel bed, the distance between the fuel bounding surface of the outer wall of the generator and the fuel bounding surface of the pier and the cross-sectional area of the fuel bed between said walls, being correlated in a predetermined manner dependent upon the extent of each area of fuel bed known to be active relative to to each wall, so as to provide means for preventing the formation of inactive fuel masses which would otherwise normally be formed in the fuel bed during operation; means for blasting the fuel bed in said generator; and means for taking off the gas as it is formed.

6. The herein described improved generator for combustible gas which includes: a gas generating chamber having an outer bounding wall; a pier disposed centrally within said generating chamber, the outer surface of said pier and the inner surface of the outer bounding wall of the generating chamber providing a fuel compartment closed at the bottom by a grate, the latter being adapted to support a fuel bed, the vertically extending fuel bounding surfaces of said pier and said outer wall being spaced apart a predetermined distance dependent upon the sum of the known horizontal widths of the areas of activity of the fuel bed normally contiguous to each of the pier and outer wall bounding surfaces, and providing means operating to maintain substantially maximum horizontal widths of active areas relative to each wall in juxtaposed relaton and merged substantially at their inner adjacent extremities between said walls, thereby preserving a maximum total area of fuel bed which can thus be rendered continuously active and preventing formation of inactive fuel masses which would otherwise normally be formed in the fuel bed during operation of the generator; and means for blastng the fuel bed in said generator.

In witness that we claim the foregoing we have hereunto subscribed our names this 21st day of August, 1926.

WILLIS J. MURDOCK.
EDGAR E. LUNGREN.
OWEN B. EVANS.